United States Patent [19]

Litt

[11] Patent Number: 4,824,230

[45] Date of Patent: Apr. 25, 1989

[54] VISUALIZATION DEVICE

[75] Inventor: Gerald J. Litt, Wellesley, Mass.

[73] Assignee: E. I. Du Pont de Nemours and Company, Wilmington, Del.

[21] Appl. No.: 808,461

[22] Filed: Dec. 13, 1985

[51] Int. Cl.⁴ .................... G01N 1/28; G01N 21/01
[52] U.S. Cl. ............................ 350/574; 350/535; 350/536; 356/244; 356/397; 422/65; 422/73
[58] Field of Search ............ 422/65, 73; 206/438; 356/244, 397, 436, 440; 435/299, 300, 301; 350/534, 535, 536, 321

[56] References Cited

U.S. PATENT DOCUMENTS

| | | | |
|---|---|---|---|
| 4,154,795 | 5/1979 | Thorne | 435/300 |
| 4,171,866 | 10/1979 | Tolles | 356/244 |
| 4,321,330 | 3/1982 | Baker et al. | 435/300 |
| 4,710,031 | 12/1987 | Kelly et al. | 356/244 |

Primary Examiner—John K. Corbin
Assistant Examiner—Terry S. Callaghan

[57] ABSTRACT

Apparatus for indicating the presence of a liquid on a member includes a substrate having a pattern thereon that is perceptibly visually modified by the presence of a liquid on the member.

1 Claim, 1 Drawing Sheet

VISUALIZATION DEVICE

BACKGROUND OF THE INVENTION

1. Field of the Invention

The present invention relates to a device for visualizing the presence and/or distribution of a liquid on a microtiter plate, microscope slide, glass cover slip or other laboratory member.

2. Description of the Prior Art

Microtiter plates are typically multi-well devices used primarily in biochemical analyses, particularly assays using the so-called ELISA techniques. Each well in the plate may receive a sample of a serum or other liquid under test. Suitable additional reagents may be added to the wells, either individually or "en masse," using hand held or automatic pipesetting techniques. Thereafter, following appropriate incubation and washing stages, the results of the biochemical reaction produced by the introduction of the reagent into the well may be automatically or manually monitored.

It is also common practice in a laboratory setting to use a so-called cover slip, or very thin glass plate akin to a microscope slide, to carry a liquid medium or sample for reaction with, for example, fixed cells and for subsequent microscopial examination.

Presently difficulty attends the determination as to whether a particular well in a microtiter plate or portion of a glass slip has a liquid sample disposed thereon. Further, it is often important to have a visual estimate of the relative volume and uniformity of distribution of liquid on the slip.

Accordingly, in view of the foregoing, it is believed to be advantageous to provide an inexpensive, easy-to-use arrangement operable with a cover slip, microscope slide, microtiter plate or other laboratory member to provide an indication as to the presence, uniformity of distribution and, in some instances, relative volume of liquid in or on the same.

SUMMARY OF THE INVENTION

The present invention relates to an apparatus for providing a visual indication of the presence of a liquid sample on a laboratory member such as a microtiter plate, microscope slide, glass cover slip or appropriate other laboratory member. In addition, the apparatus is also adapted, in appropriate cases, to provide an indication of the relative volume and/or distribution of the liquid sample.

The apparatus comprises a substrate with a substantially planar surface thereon. The substrate carries a predetermined visual pattern thereon. The substrate is positionable by a suitable mounting device to lie substantially parallel to, and a predetermined adjustable distance from, a laboratory member to be observed. As a result of the juxtaposition of the substrate with respect to the laboratory member, light reflected from the pattern and passing through the member is refracted and focused by the presence of the liquid thereby to alter the visual perception of the pattern by an observer and thus provide a visually perceptible indication of the presence, relative volume and/or distribution of the liquid.

The invention may be used in one particular embodiment with a microtiter plate having a plurality of wells therein. In an alternative embodiment, the invention may be used to ascertain the presence and/or distribution of a liquid on the surface of a planar member such as microscope slide or glass cover slip.

BRIEF DESCRIPTION OF THE DRAWINGS

The invention will be more fully understood from the following detailed description thereof, taken in connection with the accompanying drawings which form a part of this application and in which.

DETAILED DESCRIPTION OF THE INVENTION

Figure 1:
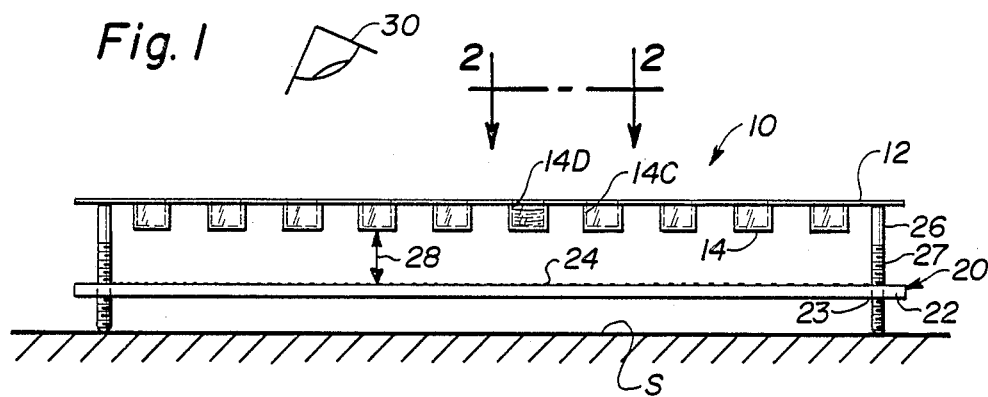
FIG. 1 is a side elevation view of an apparatus embodying the present invention adapted to provide an indication of the presence of a liquid in wells of a microtiter plate.

Throughout the following detailed description similar reference numerals refer to similar elements in all figures of the drawings.

As noted earlier, laboratory technicians working with any assay involving so-called ELISA techniques or using slides and incubating the same in Petri dishes are often faced with the problem of ascertaining the completeness of the dispensation of liquid into or onto the surface of the member being used. In some circumstances the technician is faced with the difficulty of ascertaining whether liquid is present in some or all of the wells in a multi-well member known as a microtiter plate. In other circumstances the technician is presented with the problem of ascertaining the presence and/or uniformity of distribution of liquid on the surface of a member such as a microscope slide or cover slip when the same is in repose in a Petri dish or other laboratory vessel. The present invention provides a simple, inexpensive and easy-to-use apparatus for ascertaining the presence and/or uniformity of distribution of a liquid on a member in these and other circumstances encountered by a technician in a laboratory setting.

Referring to FIG. 1, a laboratory member to be observed using an apparatus embodying the teachings of the present is shown in the form of a microtiter plate 10. The plate 10 is illustrated a shaving a substantially planar base 12 from which is supported a matrix-like array of wells 14. The plate 10 is typically fabricated from optically transparent material. The lower boundary of the individual wells 14 of the plate 10 may be either planar or curved.

A visualization apparatus 20 in accordance with the present invention is shown in FIG. 1 as comprising a generally planar substrate 22 having a predetermined optical pattern 24 supported thereon. The pattern is perhaps best seen in FIG. 2. The substrate 22 may be fabricated in any suitable manner, in any suitable configuration and from any suitable materials consistent with its function as a supporting base for the pattern 24. The apparatus 20 may itself be mounted or otherwise suitably supported on a surface S, such as a laboratory table (FIG. 1).

In the preferred instance, the substrate 22 is formed from an optically transparent material such as a clear plastic. The pattern 24 is embedded in the body of the substrate 22. The pattern 24 may be any visually perceptible arrangement of figures, motifs, designs, themes, images, whether in black and white or in color. In the preferred embodiment, the pattern 24 is in the form of a graphic arts pattern manufactured by Para-tone, Inc. Such patterns are available from Scientific Instrument Services, Inc., Ringols, New Jersey.

The substrate 22 is provided with mounting legs 26 at convention locations thereon. The legs 26 serve to support the microtiter plate 10 a predetermined clearance distance 28 above the plane of the pattern 24. In the embodiment shown in FIG. 1, the legs 26 are adjustable with respect to the plate 10 by means of screw threads which interact with similarly threaded openings provided in the substrate 22. Of course, any suitable mounting arrangement that serves to support the member being observed a predetermined optimum distance from the substrate 22 and from the pattern 24 lies within the contemplation of the present invention.

Figure 2:
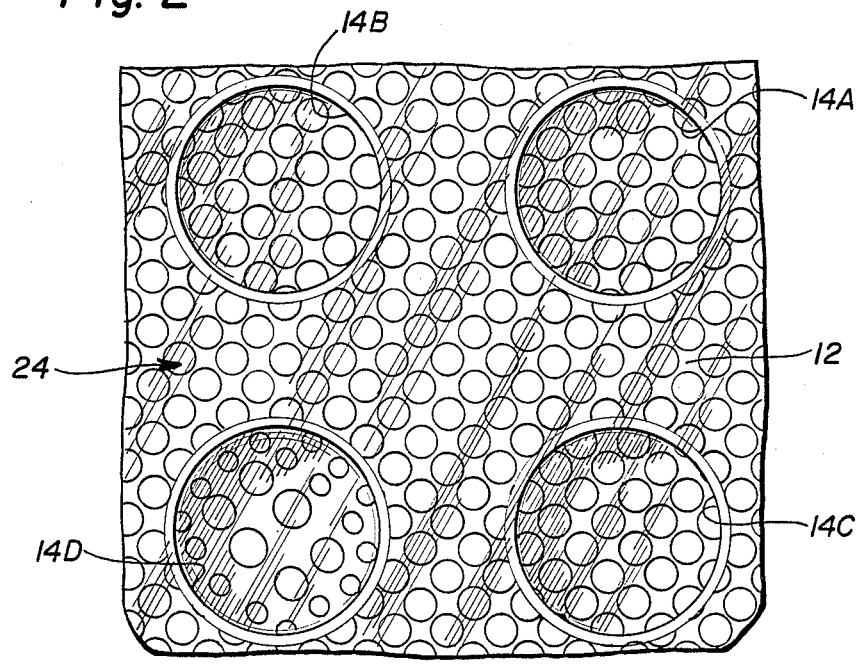
FIG. 2 is an enlarged top view taken along view lines 2—2 in FIG. 1.

In operation, the member 10 to be observed is placed by an operator (diagrammatically indicated at 30) on the apparatus 20. The height of the legs 26 on the substrate 22 is adjusted until the predetermined optimum distance 28 is defined. Light reflected from the pattern 24 passes through the member 10 being observed. The presence of liquid on or in the member 10 being observed will refract and/or focus the reflected light and alter the visual perception of the pattern 24 to the observer. This is illustrated in the instance of the microtiter plate as schematically shown in FIG. 2. The alteration of the pattern 24 is perhaps best illustratable in this Figure as an alteration in the regularity in the size and spacing in the pattern 24. The refractive properties of the liquid in the well 14D has altered the visual perception of the pattern 24 disposed therebelow. The pattern 24 disposed beneath the wells 14A, 14B and 14C is shown as being visually unaltered. Different patterns would be visually altered in different fashions. For example, it lies within the contemplation of this invention to provide a pattern 24 which changes color due to the refractive properties of a liquid by causing spots of various primary colors to meld together to form a distinctive different color. Similarly, the refractive and/or focusing effect of the liquid will enable the use of a suitable grating pattern whereby the effect of the liquid would be to visually alter the pattern defined by the ruling on the grating.

Whatever the form of the pattern 24 used, the presence of liquid on or in the member 10 being observed changes the perception of the pattern 24 to an observer and thus provides a visually perceptible indication of the presence and/or the uniformity of the distribution of the liquid. In some instances it may also be possible to ascertain the approximate volume of the liquid present on or in the member 10.

Figure 3:
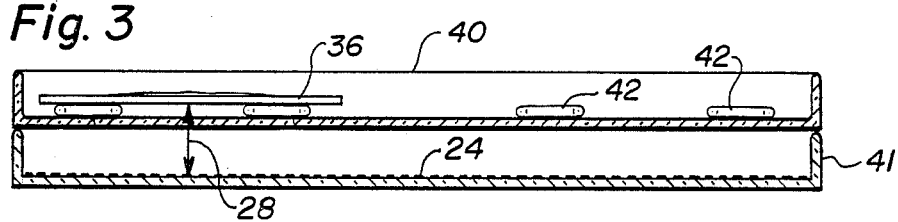
FIG. 3 is a side elevation view in section of an apparatus in accordance with the present invention adapted to provide an indication of the presence and/or uniformity of distribution of a liquid on the surface of a clear planar member, as a microscope slide or glass cover slip, as the same is housed in suitable vessel such as a Petri dish.

The embodiment of the invention shown in FIG. 3 is adapted for use in providing a visual indication of the presence of liquid on a different type of laboratory member such as a planar transparent member in the form of a microscope slide or glass cover slip 36. The planar member 36 is housed within an optically clear vessel such as a Petri dish 40. The dish 40 may be supported on the legs 26 analogously to the plate 10 (FIG. 1). Alternatively, the dish 40 may be supported atop another Petri dish 41 having a pattern 24 therein. The height of the supporting dish 41 serves to support the member 36 being observed the predetermined distance 28 from the pattern 24. Suitable abutments 42, in the form of small O-rings, may be disposed on the bottom of the dish 40 to facilitate the manipulation of the planar member 36. Such abutments 36 are especially useful if the planar member 36 is in the form of a thin glass cover slip. As in the case of the microtiter plate light reflected from the pattern 24 passes through the bottom of the dish 40, through the planar member 36 and to the eye of the observer. A liquid on the surface of the planar member 36 alters the visual perception of the pattern 24 to the eye of the observer and thus provides an indication of the same.

Those skilled in the art, having the benefit of the teachings of the present invention, may impart numerous modifications thereto. For example, it is apparent that the apparatus in accordance with the present invention may be used with laboratory members other than those here discussed. In addition the pattern may be oriented in positions where the path of the light reflected from the pattern does not pass directly to the eye of the observer. As another alternative, it should be possible to project the pattern into and through the laboratory member. It should be understood, however, these and other modifications are to be construed as lying within the scope of the present invention as defined by the present claims.

What is claimed is:

1. Apparatus for determining the presence of a liquid on a microtiter plate, the apparatus comprising a substrate having a pattern thereon, the pattern having contrasting first and second areas, the substrate being positioned below the microtiter plate so that at least a portion of a first and second contrasting area is visible through the microtiter plate and so that light reflected from the portion of the pattern visible through the plate is passed through the microtiter plate, the visual perception of the contrasting areas of the pattern observable by an observer being modified by the presence of liquid on the microtiter plate, thereby providing a visually perceptible indication of the liquid.

* * * * *